(12) United States Patent
Hatakeyama et al.

(10) Patent No.: US 9,496,816 B2
(45) Date of Patent: Nov. 15, 2016

(54) AIR CONDITIONER CONTROLLING PRHEATING POWER OF COMPRESSOR AND MECHANISM PROVIDING PREHEATING POWER FOR COMPRESSOR

(75) Inventors: Kazunori Hatakeyama, Tokyo (JP); Kazunori Sakanobe, Tokyo (JP);
(Continued)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 966 days.

(21) Appl. No.: 13/514,066

(22) PCT Filed: Mar. 23, 2010

(86) PCT No.: PCT/JP2010/002017
§ 371 (c)(1),
(2), (4) Date: Jun. 6, 2012

(87) PCT Pub. No.: WO2011/074145
PCT Pub. Date: Jun. 23, 2011

(65) Prior Publication Data
US 2012/0234031 A1 Sep. 20, 2012

(30) Foreign Application Priority Data
Dec. 17, 2009 (JP) ................... 2009-286305

(51) Int. Cl.
*F25B 49/02* (2006.01)
*H02P 27/04* (2016.01)

(52) U.S. Cl.
CPC .............. *H02P 27/04* (2013.01); *F25B 49/025* (2013.01); *F25B 2600/021* (2013.01); *F25B 2700/04* (2013.01); *Y02B 30/741* (2013.01)

(58) Field of Classification Search
CPC .............. F25B 49/025; F25B 2600/021; F25B 2700/04; H02P 27/04; Y02B 30/741
(Continued)

(56) References Cited

U.S. PATENT DOCUMENTS

2003/0098298 A1* 5/2003 Dohmae et al. ............... 219/209
2005/0247073 A1* 11/2005 Hikawa et al. ............... 62/228.1
(Continued)

FOREIGN PATENT DOCUMENTS

CH WO 2008003709 A1 * 1/2008 ............... H02P 6/18
EP 2 012 410 A1 1/2009
(Continued)

OTHER PUBLICATIONS

Jul. 10, 2012 International Preliminary Report on Patentability issued in PCT/JP2010/002017.
(Continued)

*Primary Examiner* — Marc Norman
(74) *Attorney, Agent, or Firm* — Buchanan Ingersoll & Rooney PC

(57) ABSTRACT

An air conditioner equipped with a compressor, an indoor heat exchanger and an outdoor heat exchanger includes: an inverter circuit that drives a motor of the compressor; an inverter-power detecting unit that detects power of the inverter circuit; a PWM-signal generating unit that inverter-current detecting unit generates PWM signals for controlling the inverter circuit; a voltage-command-value generating unit that outputs voltage command values to the PWM-signal generating unit; and an accumulation detecting unit that detects accumulation of a liquid refrigerant within the compressor and outputs a detection result to the voltage-command-value generating unit, wherein when accumulation of a liquid refrigerant within the compressor is detected, the voltage-command-value generating unit outputs the volt-
(Continued)

age command value so that power of the inverter circuit has a predetermined power value.

12 Claims, 4 Drawing Sheets

(75) Inventors: Shinya Matsushita, Tokyo (JP);
Tsutomu Makino, Aichi (JP)

(58) Field of Classification Search
USPC ........ 62/228.1, 230; 417/13, 44.1, 44.11, 45
See application file for complete search history.

(56) References Cited

U.S. PATENT DOCUMENTS

| | | | |
|---|---|---|---|
| 2006/0238150 A1* | 10/2006 | Baumgartner | H02P 6/18 318/400.03 |
| 2008/0018190 A1 | 1/2008 | Takahata et al. | |
| 2010/0001673 A1* | 1/2010 | Cardoletti | H02P 6/18 318/400.34 |

FOREIGN PATENT DOCUMENTS

| | | |
|---|---|---|
| JP | 60-68341 | 5/1985 |
| JP | 60-68341 U | 5/1985 |
| JP | 61-091445 A | 5/1986 |
| JP | 63-294461 A | 12/1988 |
| JP | 5-41836 B2 | 6/1993 |
| JP | 7-043027 A | 2/1995 |
| JP | 7-167504 A | 7/1995 |
| JP | 11-324934 A | 11/1999 |
| JP | 2002-151242 A | 5/2002 |
| JP | 2006-098111 A | 4/2006 |
| JP | 2007-295676 A | 11/2007 |
| JP | 2008-029095 A | 2/2008 |

OTHER PUBLICATIONS

International Search Report (PCT/ISA/210) issued on Jun. 1, 2010, by the Japanese Patent Office as the International Searching Authority for International Application No. PCT/JP2010/002017.

Written Opinion (PCT/ISA/237) issued on Jun. 1, 2010, by the Japanese Patent Office as the International Searching Authority for International Application No. PCT/JP2010/002017.

* cited by examiner

AIR CONDITIONER CONTROLLING PRHEATING POWER OF COMPRESSOR AND MECHANISM PROVIDING PREHEATING POWER FOR COMPRESSOR

FIELD

The present invention relates to a method of heating a compressor used in an air conditioner.

BACKGROUND

According to a conventional air conditioner, when a refrigerating cycle is stopped for a long period of time and a compressor is maintained at a low temperature, a liquid refrigerant accumulates in a compressor suction pipe-line, liquid compression occurs when the air conditioner is activated, and thus a shaft torque becomes excessive. This results in breakage of the compressor.

To provide a compressor driving device for an air conditioner that enables efficient heating from inside of a compressor when the compressor itself is at a low temperature, there has been known a compressor driving device for an air conditioner that applies a fixed alternating-current voltage, which cannot be followed by a movable part of the compressor and has a frequency higher than that of the normal operation, to the compressor at a regular time interval while the operation of the compressor is stopped, and continuously applies a fixed alternating-current voltage to the compressor when a current detecting unit detects a current value higher than a predetermined set value at that time (see, for example, Patent Literature 1).

CITATION LIST

Patent Literature

Patent Literature 1: Japanese Patent Application Laid-open No. H11-324934 (paragraph [0006] and FIG. 1)

SUMMARY

Technical Problem

However, according to the technique of Patent Literature 1, for example, when this technique is applied to a permanent-magnet synchronous motor having a saliency ratio, because an inductance value is different depending on a position of the rotor, the power input to the motor is different depending on the rotor position even when an alternating-current voltage is applied for a fixed period of time, and a liquid refrigerant may stay in some cases according to the rotor position.

The present invention has been achieved in view of the above problems, and an object of the present invention is to provide an air conditioner with high reliability that can eliminate a liquid refrigerant within a compressor regardless of a rotor position by heating the compressor with a fixed voltage.

Solution to Problem

In order to solve the aforementioned problems, an air conditioner including a compressor, an indoor heat exchanger and an outdoor heat exchanger according to one aspect of the present invention is configured in such a manner as to include: an inverter circuit that drives a motor of the compressor; an inverter-power detecting unit that detects power of the inverter circuit; a PWM-signal generating unit that generates PWM signals for controlling the inverter circuit; a voltage-command-value generating unit that outputs voltage command values to the PWM-signal generating unit; and an accumulation detecting unit that detects accumulation of a liquid refrigerant within the compressor and outputs to the voltage-command-value generating unit, wherein when accumulation of a liquid refrigerant within the compressor is detected, the voltage-command-value generating unit outputs the voltage command value so that power of the inverter circuit has a predetermined power value.

Advantageous Effects of Invention

According to the present invention, it is possible to obtain an air conditioner with high reliability that can eliminate a liquid refrigerant within a compressor regardless of a rotor position.

REFERENCE SIGNS LIST

1 COMPRESSOR
2 FOUR-WAY VALVE
3 OUTDOOR HEAT EXCHANGER
4 EXPANSION VALVE
5 INDOOR HEAT EXCHANGER
6 REFRIGERANT PIPE
7 COMPRESSION MECHANISM
8 MOTOR
9 INVERTER
10 INVERTER CONTROL UNIT
11 INVERTER-VOLTAGE DETECTING UNIT
12 INVERTER-CURRENT DETECTING UNIT
13 ACCUMULATION DETECTING UNIT
14 VOLTAGE-COMMAND-VALUE GENERATING UNIT
15 INTEGRATOR
16 PWM-SIGNAL GENERATING UNIT
17a to 17f SWITCHING ELEMENT
18 VOLTAGE-COMMAND-AMPLITUDE CONTROL UNIT
19 INVERTER-POWER CALCULATING UNIT
20 ALTERNATING-CURRENT POWER SUPPLY
21 RECTIFIER
22 SMOOTHENING UNIT
23 ALTERNATING-VOLTAGE DETECTING UNIT
24 ALTERNATING-CURRENT DETECTING UNIT

25 ALTERNATING-CURRENT-POWER CALCULATING UNIT

DESCRIPTION OF EMBODIMENTS

First Embodiment

Figure 1:
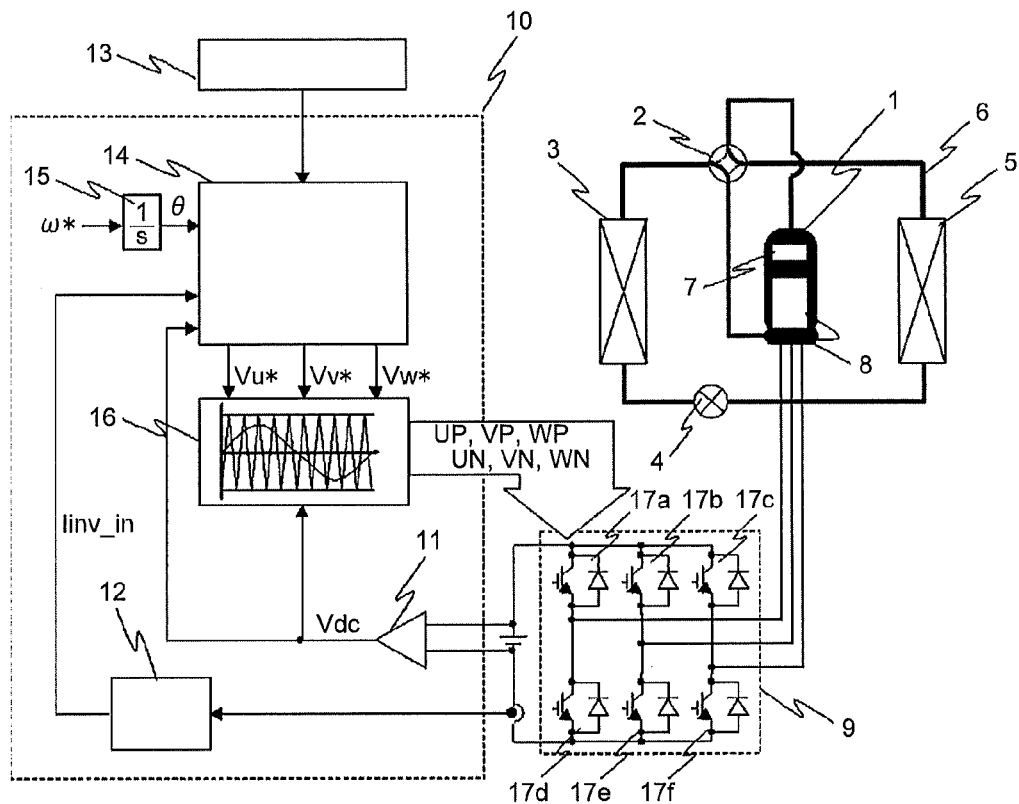
FIG. 1 is a configuration diagram of an air conditioner according to a first embodiment.

FIG. 1 is a configuration diagram of an air conditioner according to a first embodiment.

As shown in FIG. 1, a compressor 1, a four-way valve 2, an outdoor heat exchanger 3, an expansion valve 4, and an indoor heat exchanger 5 constitute a refrigerating cycle in which these components are mounted via a refrigerant pipe 6, and these elements constitute a separate-type air conditioner. A compression mechanism 7 that compresses a refrigerant and a motor 8 that operates the mechanism are provided within the compressor 1. Furthermore, an inverter 9 that applies voltage to the motor 8 for driving the same is electrically connected to the motor 8.

The inverter 9 is constituted by switching elements 17a to 17f connected to each other by a bridge connection. By PWM (Pulse Width Modulation) signals transmitted from an inverter control unit 10, the corresponding switching elements are driven. That is, six types of signals (UP, VP, WP, UN, VN, and WN) are output as the PWM signal, wherein UP drives 17a, VP drives 17b, WP drives 17c, UN drives 17d, VN drives 17e, and WN drives 17f, respectively.

An inverter-voltage detecting unit 11 that detects an input voltage of the inverter 9 and an inverter-current detecting unit 12 that detects an input current of the inverter 9 are provided in the inverter control unit 10. Furthermore, a voltage-command-value generating unit 14 that generates voltage command values, an integrator 15 that integrates input signals to output the integration result, and a PWM-signal generating unit 16 that receives voltage command values output from the voltage-command-value generating unit 14 to generate PWM signals are also provided in the inverter control unit 10.

An accumulation detecting unit 13 detects accumulation of a refrigerant within the compressor 1 and outputs the detection result to the voltage-command-value generating unit 14. Any known techniques can be used as the detection method. For example, the temperature within a compressor is detected in advance and when a lapse of time after a detected value becomes equal to or less than a predetermined value is longer than a predetermined value, it is detected that a refrigerant is accumulating. Alternatively, the amount of a liquid refrigerant within the compressor may be detected directly.

The operation is explained next.

An outdoor unit of an air conditioner including the compressor 1 is cooled when the outdoor temperature is low, particularly in the winter night. When the outdoor temperature rises at the dawn, only the compressor 1 having the largest heat capacity is left in the cooled state. The refrigerant having a property of gathering in a lowest-temperature portion gathers in the compressor 1 so as to be in an accumulation state.

The accumulation detecting unit 13 detects accumulation based on information such as the temperature of a refrigerating cycle, the lapse of time and so on while the operation of the compressor 1 is in a stopped state. When an accumulation state is detected, the inverter control unit 10 generates a PWM signal for preheating. Because the refrigerant particularly tends to accumulate from the time when the outdoor temperature is lowered to the time when the outdoor temperature rises, by generating the PWM signal for preheating when the temperature is rising, the preheating operation can be performed only when the refrigerant is definitely in the accumulated state.

When the accumulation detecting unit 13 detects accumulation of the refrigerant within the compressor 1, the inverter control unit 10 calculates voltage command values Vu*, Vv*, and Vw* for driving the inverter 9 in the voltage-command-value generating unit 14, outputs PWM signals from the PWM-signal generating unit 16 based on the voltage command values, and drives the switching elements 17a to 17f for performing a preheating operation.

Figure 2:
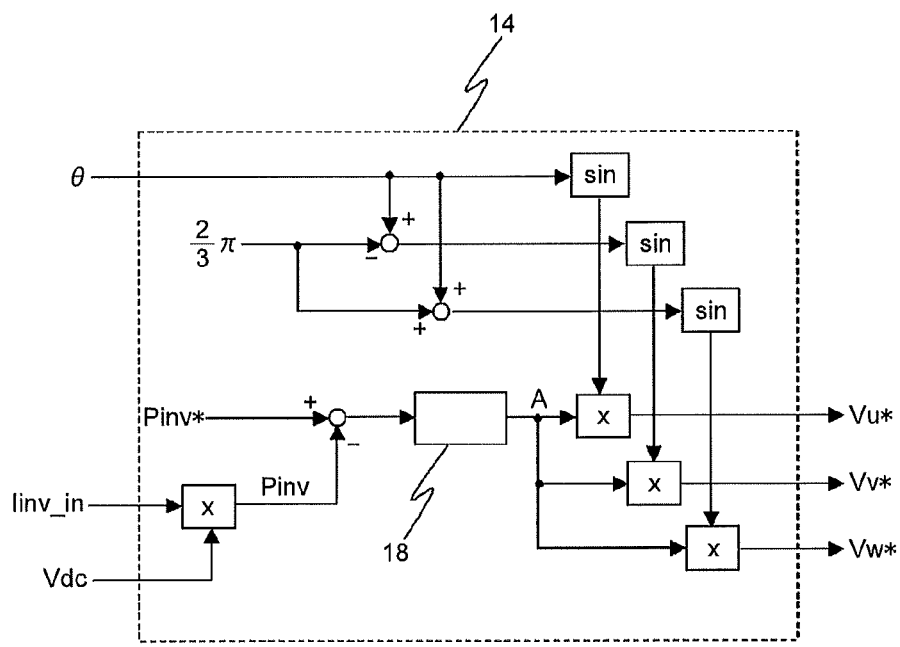
FIG. 2 depicts an operation of a voltage-command-value generating unit according to the first embodiment.

An operation that the voltage-command-value generating unit 14 outputs the voltage command values Vu*, Vv*, and Vw* is explained. FIG. 2 depicts an operation of the voltage-command-value generating unit 14 according to the first embodiment. The voltage-command-value generating unit 14 outputs the voltage command values Vu*, Vv* and Vw* based on an output Vdc of the inverter-voltage detecting unit 11, an output Iinv_in of the inverter-current detecting unit 12, and a voltage phase command θ obtained by integrating a rotational speed command ω* in the integrator 15. It should be noted that the inverter-voltage detecting unit and inverter-current detecting unit configure an inverter-power detecting unit.

Specifically, as shown in FIG. 2, power Pinv of the inverter is calculated first by a product of the output Vdc of the inverter-voltage detecting unit 11 and the output Iinv_in of the inverter-current detecting unit 12. Based on a difference between the Pinv and a power command Pinv* of the inverter arbitrarily designated, an amplitude A of the voltage command value is calculated by a voltage-command-amplitude control unit 18. As for Pinv*, it can be appropriately designed by data such as the heat capacity of a compressor, a typical value of Pinv, and a permitted preheating time and so on.

Furthermore, as the method of calculating the amplitude A by the voltage-command-amplitude control unit 18, a general control method such as proportional control, proportional-integral control, and proportional-integral-derivative control can be used. Therefore, the amplitude of the voltage command value can be controlled in such a manner that the power of the inverter is fixed, and thus heating of the motor 8 regardless of the rotor position is made possible. For example, in a case of the proportional control, the amplitude A can be calculated by [Equation 1], and in a case of the proportional integral control, the amplitude A can be calculated by [Equation 2].

$$A = Kp(P\text{inv}^* - P\text{inv}) \quad \text{[Equation 1]}$$

$$A = Kp(P\text{inv}^* - P\text{inv}) + Ki \int (P\text{inv}^* - P\text{inv}) dt \quad \text{[Equation 2]}$$

In [Equation 1] and [Equation 2], Kp denotes a proportional control gain and Ki denotes an integral control gain.

Meanwhile, in the voltage-command-value generating unit 14, sinusoidal waves with their phases being different from each other by $2\pi/3$ are generated based on the voltage phase command θ, and products of the sinusoidal waves and the calculated amplitude A are output as the voltage command values Vu*, Vv*, and Vw* as shown in the following [Equation 3] to [Equation 5].

$$V_u^* = A\sin\theta \quad \text{[Equation 3]}$$

$$V_v^* = A\sin\left(\theta - \frac{2}{3}\pi\right) \quad \text{[Equation 4]}$$

$$V_w^* = A\sin\left(\theta + \frac{2}{3}\pi\right) \quad \text{[Equation 5]}$$

Figure 3:
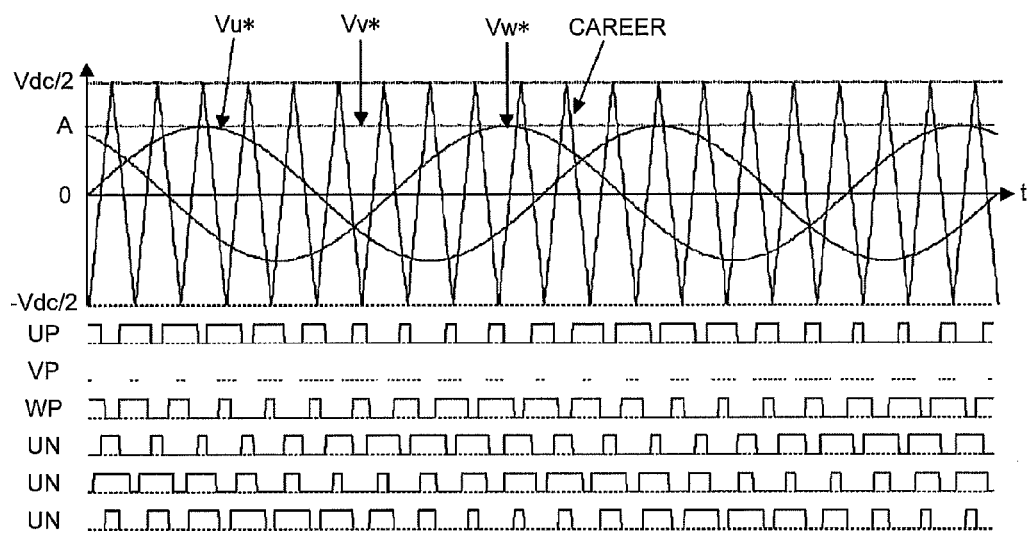
FIG. 3 is a voltage waveform diagram showing an operation of a PWM-signal generating unit.

In the PWM-signal generating unit 16, PWM signals are output based on the above voltage command values Vu*, Vv*, and Vw*. FIG. 3 is a voltage waveform diagram showing the operation of the PWM-signal generating unit 16.

The voltage command values obtained by [Equation 3] to [Equation 5] are compared with a carrier signal having an amplitude Vdc/2 at a predetermined frequency (where Vdc denotes a bus voltage detected by the inverter-voltage detecting unit 11), and the PWM signals UP, VP, WP, UN, VN, and WN are generated based on their magnitude relations. For example, when the voltage command value Vu* is larger than the carrier signal, UP outputs a voltage that switches on the switching element 17a, and UN outputs a voltage that switches off the switching element 17d. On the other hand, when the voltage command value Vu* is smaller than the carrier signal, UP outputs a voltage that switches off the switching element 17a, and UN outputs a voltage that switches on the switching element 17d. The same is true for other signals.

It is needless to mention that the voltage command values Vu*, Vv*, and Vw* can be calculated by, in addition to [Equation 3] to [Equation 5], methods such as two-phase modulation, third-harmonic superposition modulation, and space vector modulation.

By the PWM signals output in this way, the switching elements 17a to 17f of the inverter 9 are driven and a voltage is applied to the motor 8. As a result, the motor 8 can be heated at a desired power of the inverter. At this time, current flows in three phases in the motor 8 and thus uniform heating can be made. Furthermore, because heating can be made at a desired power of the inverter, heating of the motor 8 regardless of the rotor position thereof is made possible.

By heating the motor 8 in this way, the liquid refrigerant remaining in the compressor 1 is heated, evaporated, and is thereby leaked out of the compressor. When an accumulation detecting unit determines that a predetermined leakage of the refrigerant is made, it determines recovery from an accumulation state to a normal state, and heating of the motor is finished.

According to the first embodiment, because the amplitude of the voltage command value is controlled by the voltage-command-amplitude control unit 18 so that the power of the inverter circuit is fixed, an air conditioner with high reliability that can eliminate the liquid refrigerant within the compressor regardless of the rotor position can be obtained. While an operating frequency of the inverter during a compressing operation is substantially equal to or less than 1 kilohertz, by operating the inverter at an operating frequency equal to or higher than the operating frequency during the compressing operation, the motor 8 can be heated without causing any rotation torque and vibrations and efficiently by a motor iron loss caused by application of a high-frequency voltage and a copper loss generated by a current flowing in the winding.

Furthermore, when the frequency of the high-frequency voltage to be applied is equal to or higher than 14 kilohertz, which is outside an audible range, vibration sound of an iron core of the motor 8 is substantially outside the audible range, and thus noise can be reduced. Furthermore, by making the frequency of the high-frequency voltage to be equal to or lower than an upper limit of a switching frequency of the switching element, an air conditioner with higher reliability can be obtained.

According to an IPM (interior permanent magnet) motor, because its inductance value has a dependency on a rotor position, its impedance value is varied depending on the rotor position. However, according to the present embodiment, because control is performed so that the power is fixed, the motor can be heated without any heating unevenness caused by an increase or decrease in a current value according to an increase or decrease in an impedance value. Furthermore, if the motor 8 is an interior permanent magnet motor, because the surface of a rotor where high-frequency magnetic fluxes are interlinked also becomes a heat generating part, efficient heating on the refrigerant can be made.

In addition, generally, in a case of a motor with concentrated winding having a small coil end and a reduced winding resistance, because its winding resistance is small and the heat generation amount by a copper loss is small, a large amount of current needs to flow in the winding and the current flowing in the inverter 9 is also increased, and thus an inverter loss becomes excessive. However, by the heating caused by application of a high-frequency voltage according to the present embodiment, heating with a further reduced loss can be made.

That is, because the high-frequency voltage is applied, an inductance component is increased and a winding impedance is also increased. Therefore, although a current flowing in the winding is reduced and the copper loss is also reduced, iron loss caused by application of the high-frequency voltage is generated instead, and thus effective heating can be made even in the concentrated winding motor of a reduced winding resistance. Further, because the current flowing in the winding is small, a loss of the inverter 9 is also small and heating with a further reduced loss can be made.

Because high pressure relief in a compression chamber is difficult in a scroll mechanism compressor, when a liquid refrigerant enters, an excessive stress is exerted on a compression mechanism and the compressor may be broken. Furthermore, when the refrigerant is in an accumulated state, the refrigerant is mixed with lubricating oil in the compressor. At this time, when the refrigerant is discharged, the oil is also discharged during a refrigerating cycle, and thus the oil in the compressor is reduced and burnout may possibly occur. According to the present embodiment, efficient heating in a compression chamber can be made and this is effective for preventing breakage.

Furthermore, in a case of a heating apparatus of a frequency of 10 kilohertz and an output of 50 or more watts, because of the restrictions prescribed by the Radio Act, Article 100, by adjusting the amplitude of the voltage command value in advance so as not to exceed 50 watts, or by detecting a flowing current and performing a feed back operation with a view to setting the current equal to or lower than 50 watts, the compressor can be heated in compliance with the Radio Act. Further, because the power of the entire apparatus can be managed, an energy-saving operation as needed can be performed, and control in consideration of the prevention of global warming is also possible.

Further, by changing a set value Pinv* according to the accumulation state detected by the accumulation detecting unit 13, an inverter can be driven more efficiently. For example, when the amount of accumulated refrigerant is large, by increasing the set value Pinv*, it is possible to discharge the accumulated refrigerant to outside quickly. With this configuration, as well as a heating performance can be ensured quickly, by reducing the set value of Pinv* in a case in which the amount of accumulated refrigerant is small, wasteful consumption power can be reduced, and an air conditioner that contributes to measures against global warming can be obtained.

Second Embodiment

Figure 4:
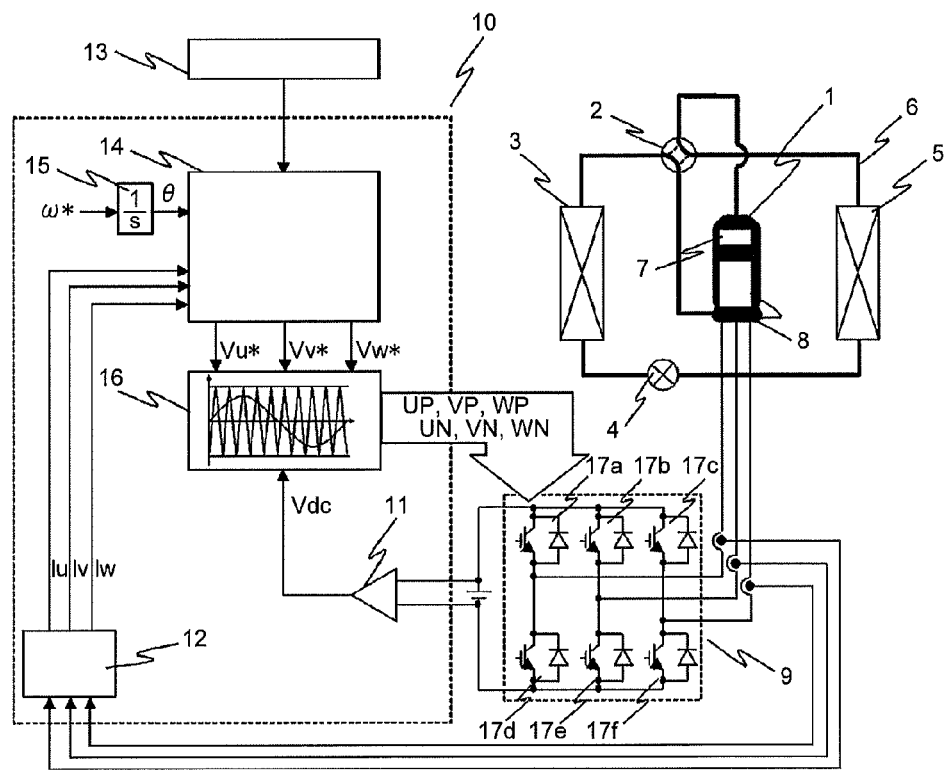
FIG. 4 is a configuration diagram of an air conditioner according to a second embodiment.

FIG. 4 is a configuration diagram of an air conditioner according to a second embodiment. In FIG. 4, constituent elements identical to those shown in FIG. 1 are denoted by like reference signs. FIG. 4 is different from FIG. 1 in that inputs of the inverter-current detecting unit 12 are UVW-phase currents Iu, Iv, and Iw serving as outputs of the inverter 9, and the UVW-phase currents Iu, Iv, and Iw are inputs of the voltage-command-value generating unit 14.

The operation is explained next. Also regarding the operation, differences from the first embodiment are mainly explained.

Figure 5:
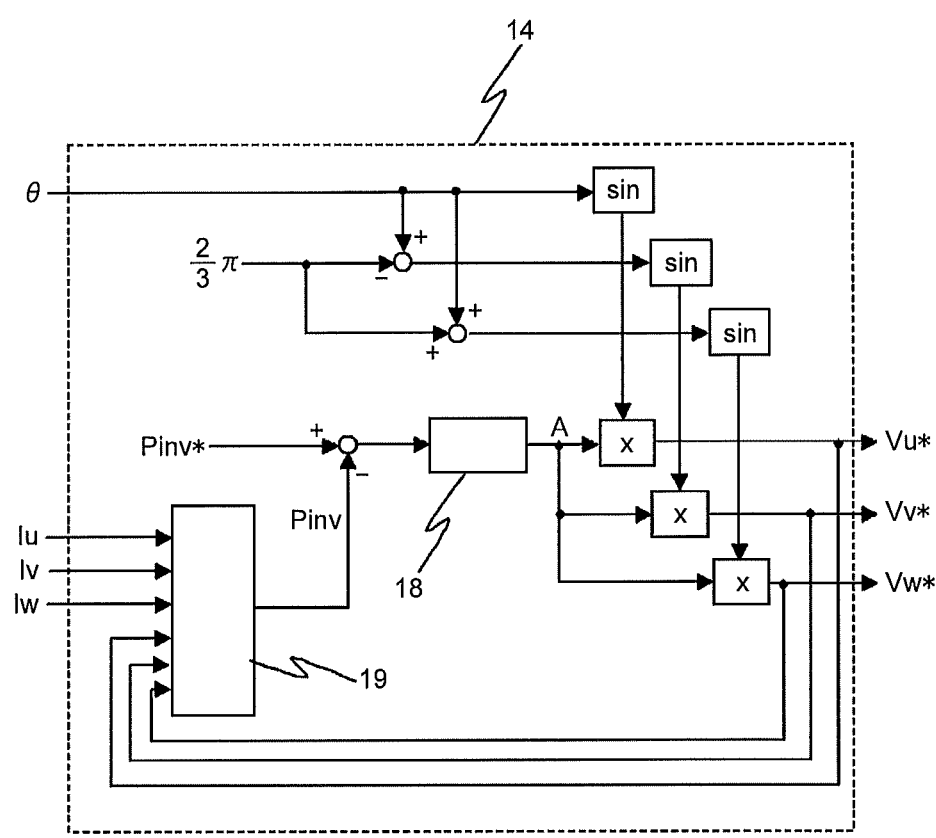
FIG. 5 depicts an operation of a voltage-command-value generating unit according to the second embodiment.

FIG. 5 depicts an operation of the voltage-command-value generating unit 14 according to the second embodiment. As shown in FIG. 5, an inverter-power calculating unit 19 is provided in the voltage-command-value generating unit 14. The inverter-power calculating unit 19 calculates the power Pinv of an inverter by [Equation 6], for example, based on the voltage command values Vu*, Vv*, and Vw* output from the voltage-command-value generating unit 14 and the UVW-phase output currents Iu, Iv, and Iw of the inverter.

$$P_{inv}=V^*_u \cdot I_u + V^*_u \cdot I_v + V^*_w \cdot I_w$$ [Equation 6]

It is needless to mention that the power Pinv of the inverter can be calculated by calculations other than [Equation 6] and by using an average value, integrated value of the power Pinv of the inverter and so on.

Based on a deviation between the calculated Pinv and the power command Pinv* of the inverter, the amplitude A of the voltage command value is calculated by the voltage-command-amplitude control unit 18. Subsequently, the same operation as that of the first embodiment is performed.

The second embodiment can also achieve effects identical to those in the first embodiment.

Third Embodiment

Figure 6:
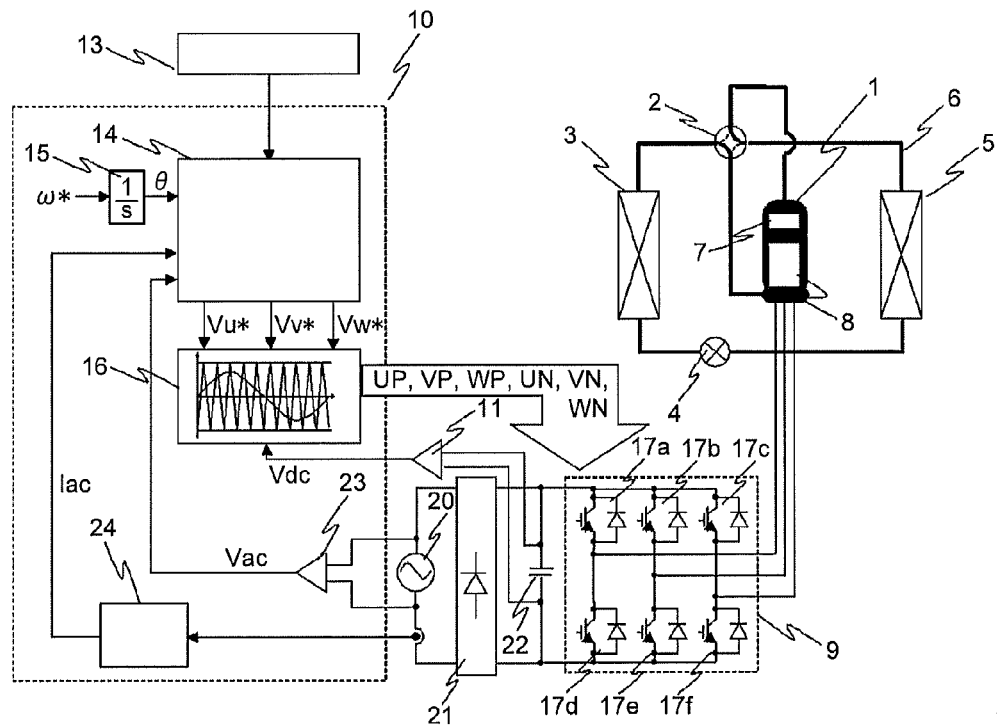
FIG. 6 is a configuration diagram of an air conditioner according to a third embodiment.

FIG. 6 is a configuration diagram of an air conditioner according to a third embodiment. In FIG. 6, constituent elements identical to those shown in FIG. 1 are denoted by like reference signs.

While a case of operating the inverter 9 by a direct-current voltage power supply has been explained in the first and second embodiments, in the third embodiment, an alternating-current power supply 20 is rectified by a rectifier 21 and smoothed by a smoothening unit 22 such as a condenser, so that a direct-current voltage is generated. FIG. 6 is different from FIG. 1 in that an alternating-voltage detecting unit 23 that detects a voltage of the alternating-current power supply 20 and an alternating-current detecting unit 24 that detects a current flowing in the alternating-current power supply 20 are provided.

The operation is explained next. Also regarding the operation, differences from the first embodiment are mainly explained.

Figure 7:
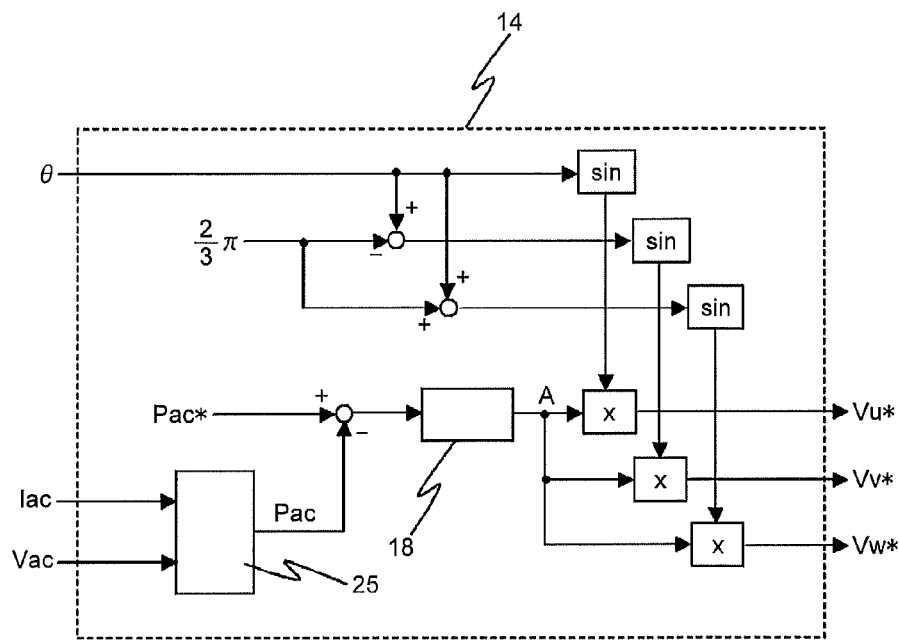
FIG. 7 depicts an operation of a voltage-command-value generating unit according to the third embodiment.

FIG. 7 depicts an operation of the voltage-command-value generating unit 14 according to the third embodiment. As shown in FIG. 7, an alternating-current-power calculating unit 25 is provided in the voltage-command-value generating unit 14. The alternating-current-power calculating unit 25 calculates an alternating-current power Pac by [Equation 7], for example, based on an output Vac of the alternating-voltage detecting unit 23 and an output Iac of the alternating-current detecting unit 24.

$$P_{ac}=V_{ac} \cdot I_{ac}$$ [Equation 7]

It is needless to mention that the alternating-current power Pac can be calculated by calculations other than [Equation 7] and by using an average value of the alternating-current power Pac and a value of integral thereof.

Based on the deviation between the calculated Pac and an alternating-current power command Pac*, the amplitude A of the voltage command value is calculated by using the voltage-command-amplitude control unit 18. Subsequently, the same operation as that of the first embodiment is performed.

The third embodiment can also achieve effects identical to those in the first embodiment.

INDUSTRIAL APPLICABILITY

The present invention is widely applicable to a refrigerating cycle using a compressor driven by an inverter such as a refrigerator, a refrigerating machine, and a heat-pump water heater, as well as an air conditioner.

The invention claimed is:

1. An air conditioner including a compressor, an indoor heat exchanger, and an outdoor heat exchanger, the compressor having a motor in which an inductance value is different depending on a position of a rotor, the air conditioner comprising:
    an inverter circuit that drives the motor of the compressor;
    an inverter-power detecting unit that detects power of the inverter circuit;
    a PWM-signal generating unit that generates PWM signals for controlling the inverter circuit;
    a voltage-command-value generating unit that outputs voltage command values to the PWM-signal generating unit; and
    an accumulation detecting unit that detects accumulation of a liquid refrigerant within the compressor and outputs a detection result to the voltage-command-value generating unit, wherein
    when accumulation of a liquid refrigerant within the compressor is detected, the voltage-command-value generating unit outputs the voltage command values so that power of the inverter circuit has a predetermined power value.

2. The air conditioner according to claim 1, wherein
    the inverter-power detecting unit includes
    an inverter-voltage detecting unit that detects an input voltage of the inverter circuit, and
    an inverter-current detecting unit that detects an input current of the inverter circuit, and
    when accumulation of a liquid refrigerant within the compressor is detected, the voltage-command-value generating unit outputs the voltage command values based on the input voltage of the inverter circuit and the input current of the inverter circuit so that power of the inverter circuit has a predetermined power value.

3. The air conditioner according to claim 1, wherein
    the inverter-power detecting unit includes an inverter-current detecting unit that detects an output current of the inverter circuit, and
    when accumulation of a liquid refrigerant within the compressor is detected, the voltage-command-value generating unit outputs the voltage command values based on the output current of the inverter circuit so that power of the inverter circuit has a predetermined power value.

4. The air conditioner according to claim 1, wherein
the inverter-power detecting unit includes
an inverter-voltage detecting unit that detects an alternating-current input voltage of the inverter circuit, and
an inverter-current detecting unit that detects an alternating-current input current of the inverter circuit, and
when accumulation of a liquid refrigerant within the compressor is detected, the voltage-command-value generating unit outputs the voltage command values based on the alternating-current input voltage of the inverter circuit and the alternating-current input current of the inverter circuit so that power of the inverter circuit has a predetermined power value.

5. The air conditioner according to claim 1, wherein an output frequency of the voltage-command-value generating unit is higher than an operating frequency of the inverter circuit during a compressing operation.

6. The air conditioner according to claim 1, wherein an output frequency of the voltage-command-value generating unit is higher than an audible range.

7. The air conditioner according to claim 1, wherein an output frequency of the voltage-command-value generating unit is lower than an upper limit of a switching frequency of switching elements that constitute the inverter circuit.

8. The air conditioner according to claim 1, wherein the motor is of an interior permanent magnet configuration.

9. The air conditioner according to claim 1, wherein the motor is a concentrated winding motor.

10. The air conditioner according to claim 1, wherein the compressor has a scroll mechanism.

11. The air conditioner according to claim 1, wherein when an operating frequency of the inverter circuit exceeds 10 kilohertz, the predetermined power value is set to be equal to or lower than 50 watts.

12. The air conditioner according to claim 1, wherein the voltage-command-value generating unit changes the predetermined power value according to an accumulation state detected by the accumulation detecting unit.

* * * * *